United States Patent [19]
Pronier

[11] 3,807,872
[45] Apr. 30, 1974

[54] PROCESS FOR REGULATING THE CONCENTRATION OF A BATH OF DYE OR COLORING AND EQUIPMENT FOR IMPLEMENTING THIS PROCESS

[75] Inventor: Bernard Victor Pronier, Lille, France

[73] Assignee: Laboratories D'Electronique Et D'Automatique Du Nord, Leonard, Haubourdin (Nord), France

[22] Filed: Nov. 26, 1971

[21] Appl. No.: 202,303

Related U.S. Application Data
[63] Continuation-in-part of Ser. No. 35,659, May 8, 1970, abandoned.

[30] Foreign Application Priority Data
May 8, 1969 France .............................. 69.14827

[52] U.S. Cl.................. 356/181, 356/185, 250/218, 250/226, 8/158, 8/1 R, 137/3
[51] Int. Cl............................ G01j 3/46, G01j 3/48
[58] Field of Search ............ 356/173, 181; 250/226, 250/218; 137/3

[56] References Cited
UNITED STATES PATENTS
| | | | |
|---|---|---|---|
| 1,996,233 | 4/1935 | Darrah................................ | 356/181 |
| 3,393,800 | 7/1968 | Durand, Jr...................... | 250/227 X |
| 3,531,208 | 9/1970 | Ward............................. | 356/177 X |

OTHER PUBLICATIONS
Waters, J., Soc. of Dyers & Colourists, Feb. 1968 pp. 74–79

Primary Examiner—Ronald L. Wibert
Assistant Examiner—R. J. Webster
Attorney, Agent, or Firm—Davis, Hoxie, Faithfull & Hapgood

[57] ABSTRACT

The invention relates to a method for controlling the concentration of a dyebath by acting on the parameters of the physical-chemical equilibrium. The selected bath process is simulated as a function of time and compared with the real bath by optical means. The signal resulting from this comparison controls the physical-chemical parameters of the real bath.

14 Claims, 5 Drawing Figures

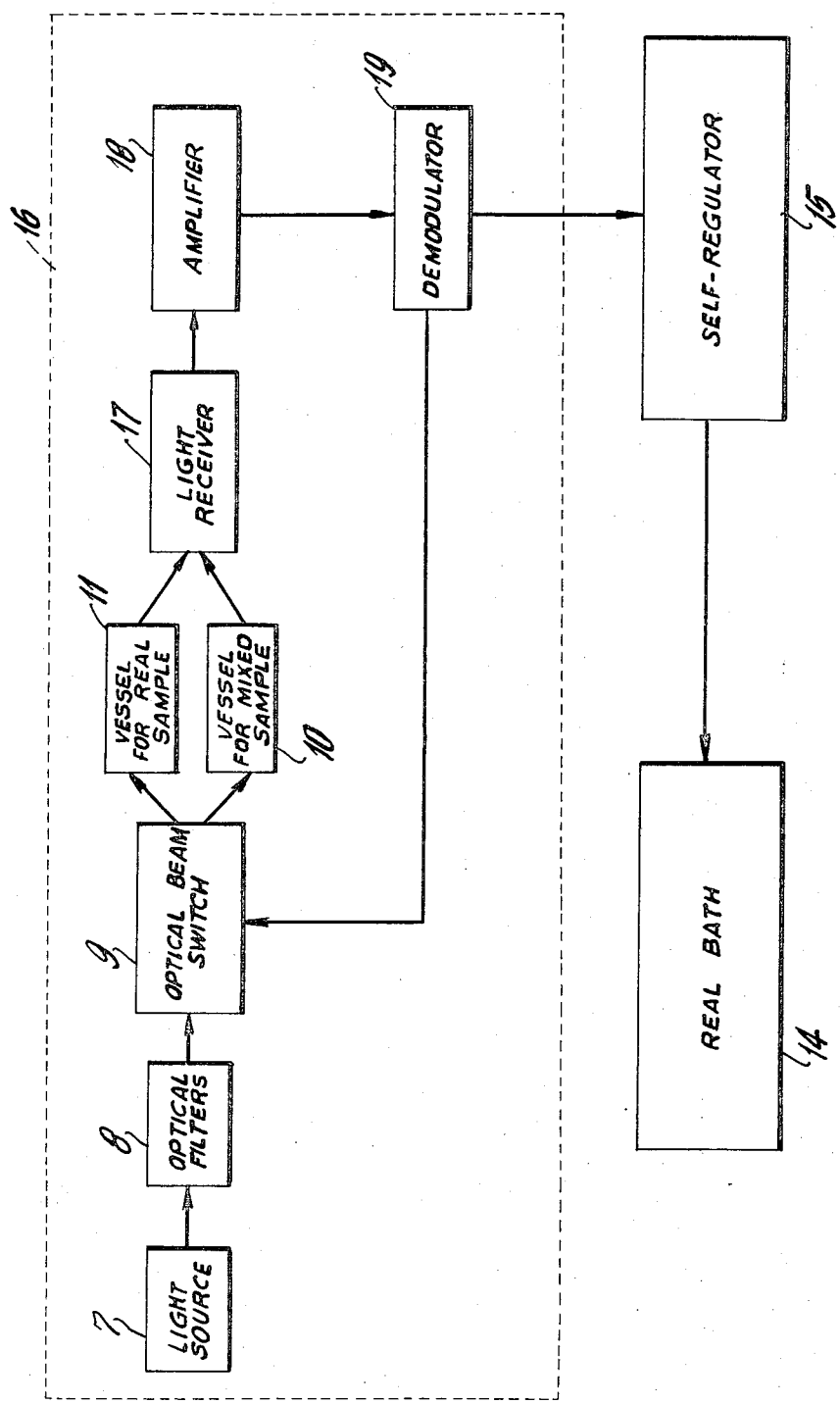

PROCESS FOR REGULATING THE CONCENTRATION OF A BATH OF DYE OR COLORING AND EQUIPMENT FOR IMPLEMENTING THIS PROCESS

This application is a continuation-in-part of my copending application, Ser. No. 35,659, filed May 8, 1970, and now abandoned.

BACKGROUND OF THE INVENTION

The present invention relates to a method for controlling the concentration of a dye or coloring bath, particularly for textile products.

In a dyebath process in which the physical-chemical parameters are not used to control the equilibrium of the bath, the concentration of the substances changes very slowly at the start of the process, as regards the deposit of dye on the product, then accelerates and finally it diminishes the rate of deposit. The disadvantage of a process of this kind is the irregular dyeing of the product. In the well wetted parts there is a substantial deposit of dye, whereas the parts only partly wetted receive only a small quantity of dye and remain pale.

Various methods are known for controlling the process in a dyebath. The temperature of the bath, for instance, may be controlled using a cam. For every different bath, a special cam has to be made, which makes this a highly complex and very empirical method. Another known method is to measure the color of the bath and convert the result into an electrical signal which may be used to control the process in the bath. This method is very delicate because it involves the absolute measurement of the color of the bath as a function of time. The results obtained are not usually satisfactory.

It has previously been proposed to make optical transmission measurements of the dyebath on a continuous sampling basis. The relationship between optical transmission and the concentration of the coloring agent follows Beer and Lambert's Law, but this relationship can be applied only on condition that several other parameters (temperature, pH, auxiliary and foreign substances, and colloidal nature of certain coloring agents) are constant. The laws governing these parameters are highly complex, and the correction which might be made to Beer and Lambert's Law is difficult, for it would require complex computing methods, and in any event a prior investigation would have to be made in order to specify the different parameters in each particular case.

SUMMARY OF THE INVENTION

It is an object of the present invention to provide a method for controlling a dyebath process with respect to time, which is simple to use and which enables the bath process to follow any pattern chosen beforehand.

It is a further object of the present invention to provide a method for controlling a dyebath which may be adapted in a simple manner to any dye and yet be independent of the dye.

It is a further object of the present invention to provide a method of control by a self-regulating process which may be applied, with great accuracy, to any dyebath.

It is a still further object of the present invention to provide a method for controlling a dyebath which does not depend on an absolute measurement of the color of the bath with respect to time.

THE DRAWING

FIG. 4 is a side view of a device for controlling the concentration of a dyebath according to one embodiment of the invention.

DESCRIPTION OF THE PREFERRED EMBODIMENT

Figure 1:
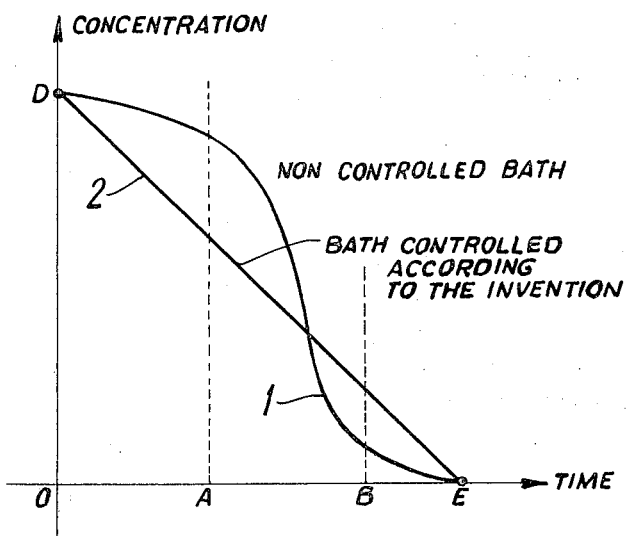
FIG. 1 shows the change in the concentration of the dyebath as a function of time.

FIG. 1 shows how the concentration of dye in a dyebath is reduced as a function of time. When an article to be dyed is put into a dyebath and there is no control of the physical-chemical parameters of the bath, the concentration of the dye is reduced as shown in curve 1. The deposit of dye on the article at any given time is the complement of the amount of dye remaining in the bath. Curve 1 shows that the consumption (or the deposit on the article) takes place slowly during the period OA. During the period AB, there is a precipitation of the dye deposit on the article which corresponds to a very sudden drop in concentration of the bath. Finally, after time B, dye consumption takes place very slowly until a virtually zero concentration is reached at time E.

The disadvantage of such a dye deposit process lies in the very rapid rate of deposit between time A and time B. This is manifested by a very irregular deposit, intense in the parts of the article to be dyed which are exposed to the strongest currents in the bath. On the other hand, in the undisturbed areas of the bath the dye stuff is not renewed quickly and hence the dyeing of the corresponding parts of the article remains poor.

The ideal procedure of a dyeing process corresponds to a linear concentration curve or an uniform consumption of the bath DE, indicated by ideal straight line 2. This ideal straight line depends on the dyebath.

The method according to the present invention is to obtain in a very simple manner the ideal consumption curve (for example a straight line) of any dyebath and to effect the self-regulation of the physical-chemical parameters of this bath, especially the temperature, so that the real bath dyeing process follows this ideal curve.

Figure 2:
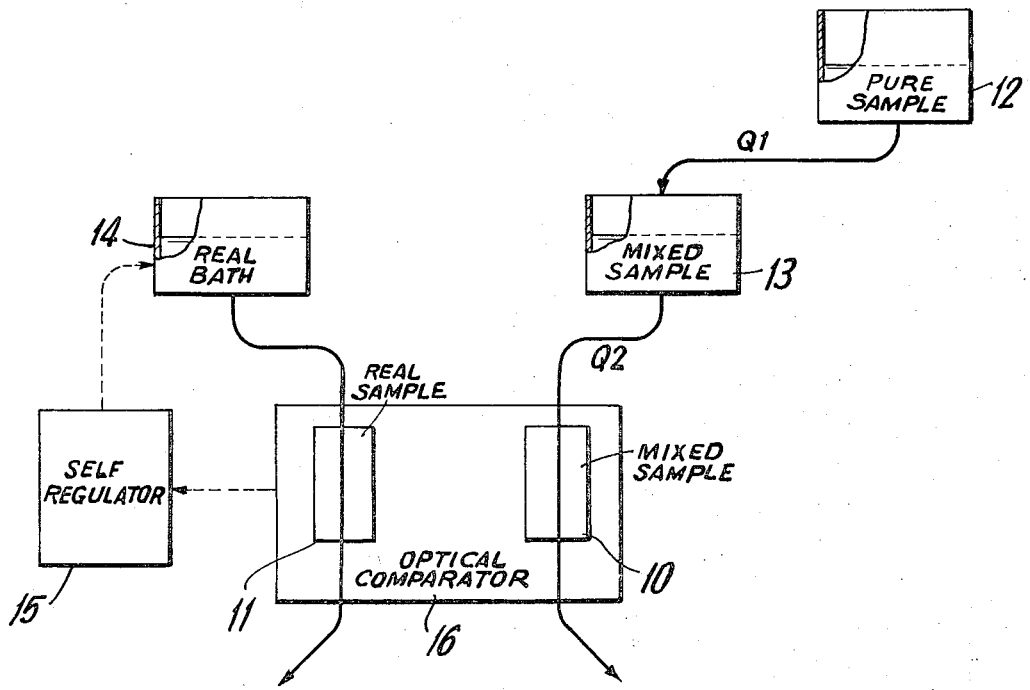
FIG. 2 is a block diagram of the method of comparison and self-regulation of the bath, according to one embodiment of the invention.

The basic steps of the method according to the present invention are indicated in FIG. 2. The first step is the preparation of the dyebath using all the additives except the dye substances. A certain volume of this bath is taken to act as the pure reference sample 12. The selected coloring agents are added to the dyebath and in this way the initial real bath 14 is obtained for dyeing the article. From this real bath 14, a certain volume is drawn off to form the initial mixed sample 13.

The theoretical consumption curve is simulated by adding steadily and continuously to the initial mixed sample 13 a certain amount of the pure sample 12. A continuous and steady flow is extracted from the mixed sample 13 and directed to the analysis vessel 10. The concentration of the mixed sample 13 is varied as a function of time by controlling the flow Q1 from the pure sample 12 to the mixed sample 13 and flow Q2 from the mixed sample 13 to the mixed sample vessel 10 by means of valves (not shown). A mixed sample is thus obtained by this dilution technique in vessel 10 by using constant flow which has a concentration which varies according to curve 2. Simultaneously, a steady and continuous flow of liquid from the real bath 14, to which the article to be dyed is added, is directed to a second analysis vessel 11. The liquids, passing through vessels 10 and 11, are continuously analyzed, for example, by colorimetry.

When a difference is detected between the analysis signal corresponding to the mixed sample 10 and the real sample 11, the equilibrium parameters of the real bath are modified in order to cancel out the difference between the two signals. To do this, the parameters are subjected to a regulating process. The preferred method is by the regulation of dyebath temperature by the use of conventional means.

Figure 3:
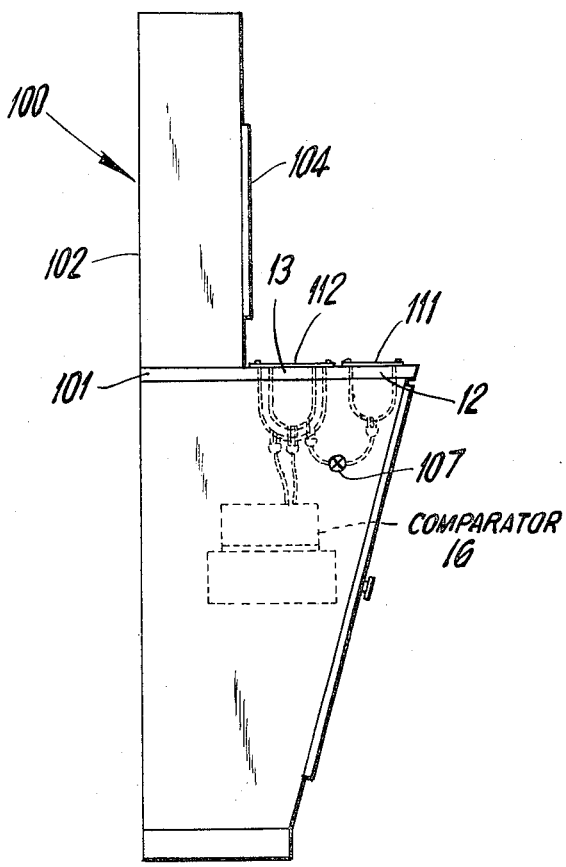
FIG. 3 is a block diagram, showing details of the optical comparator of FIG. 2.

One embodiment of apparatus for implementing the method according to the invention is shown in FIGS. 3 and 4. The apparatus is mounted in a cabinet 100, of which the projecting lower part forms a console 101. The upper part 102 comprises a conventional bath temperature recorder, control circuitry, a conventional temperature indicator and a conventional colorimetric difference indicator. The lower part 101 of the cabinet includes the simulator system, the comparison system and the self-regulator 15.

The simulator system consists of the pure sample vessel 12, the initial sample vessel 13 which, upon addition of the pure sample, becomes a mixed sample. Vessels 12 and 13 are connected by a control valve 107; vessel 13 is linked to the comparator 16. The liquid samples are removed from the comparator 16 by conventional valves not shown.

The vessels 12 and 13 of the pure sample and the initial or the mixed sample are open at the level of the upper surface of the console 101. They are filled by removing the covers 111 and 112 and by drawing off the corresponding liquid from the pure dyebath and the initial dyebath, prepared as previously described.

A portion of the real sample is also directed to the optical comparator 16 for comparison in a manner similar to the mixed sample. However, the means of transferring this sample has been omitted from FIG. 3 for ease of description.

By means of a calibrated control it is possible to obtain a complete process of a predetermined duration which is equal to the desired consumption time. The mixed sample 13 is kept at a temperature virtually equal to that of the real dyebath 14 and of the real sample 11, during the process.

The comparator system, which will be subsequently described in more detail, is connected to the self-regulator 15 which controls the real dyebath 14 and also sends signals to the colorimetric difference indicator and to the control circuitry.

FIG. 4 shows an optical comparator 16 used for self-regulation of the real bath 14. The comparator includes a light source 7, optical filters 8 and an optical beam switch 9. This switch 9 directs a beam of predetermined wavelength alternately through the mixed sample cell 10 and the real sample cell 11. The beams obtained are made to strike a light receiver 17, e.g., a photoelectric cell, a photomultiplier tube or similar device. The resulting signal from the light receiver is fed to an amplifier 18, then to a demodulator 19, which may include a memory-sampling circuit. The demodulator 19 controls the beam switch 9 and the self-regulator 15 which controls the physical-chemical parameters of the real bath 14.

The mixed sample 10 acts as a simulator, as described above, and is repeatedly compared with the real sample 11 by the comparator 16. The single light source 7 of the comparator illuminates two vessels 10 and 11, through which the two liquids pass. The light rays are analyzed by passing through a filter 8 having predetermined wavelength according to the coloring agents used. The differences in transmission values as measured by the light receiver 17 indicate whether the mixed sample 10 is darker than, equivalent to, or lighter than, the real sample.

Optical fibers may be advantageously used for guiding or transmitting the light beams. This avoids using complicated and fragile optical systems such as lenses, diaphragms etc.

The apparatus according to the present invention may be advantageously used for dyebaths having soluble coloring agents, with a transmission coefficient of at least 5 percent for a colorimetry vessel having a thickness of 1 centimetre. This represents virtually all cases of dyeing for long baths with coloring agents of the following types: acids and modified acids, metal-bearing complexes, bases and modified bases, reagents or direct coloring agents. For machines working with short baths, the colorimeter should be fitted with thinner vessels.

Figure 5:
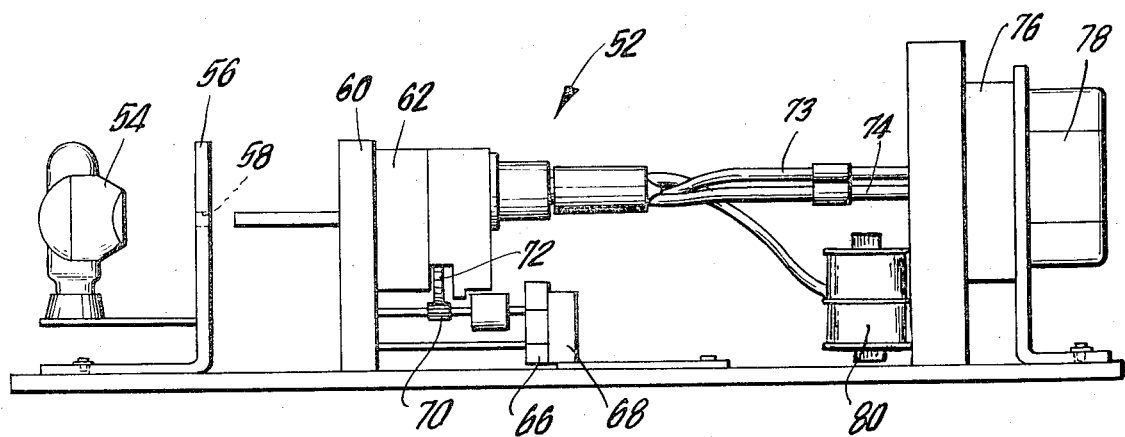
FIG. 5 is a simplified front view of one embodiment of an optical comparator according to the present invention.

Referring to FIG. 5, a simplified optical comparator or colorimeter 52 is illustrated. The colorimeter 52 includes an incandescent lamp 54, separated from the remainder of the colorimeter by a thermal screen 56. The thermal screen 56 includes an aperture 58 through which light rays emitted from the incandescent lamp 54 are transmitted.

Located proximate to the aperture 58 and attached to support 60 is an assembly of optical filters 62. These optical filters 62 are capable of being rotatably adjusted for alignment with optical fibers 73 and 74. The power means for effecting the rotational adjustment includes a motor 66 and transmission 68 which are mechanically linked to the rotational optical filters 62 through pinions 70 and 72. A desired one of the optical filters 62 is moved into alignment with the optical fibers 73 and 74 to receive the emitted light rays.

The selected optical filter 62 is the starting point for two optical fibers 73 and 74 which transmit filtered light to a measurement tank or vessel 76 which includes two prismatic measuring cells 78, only one of which is shown in FIG. 5. Behind the measuring cells 78 is a light receiver, e.g. a photocell, and amplifier which are not shown.

Before the light beams transmitted by the optical fibers 73 and 74 strike the prismatic cells 78 which contain the two liquids, i.e. the mixed sample 10 and real sample 11 as illustrated in FIGS. 2 and 4, the light beams pass through a motor driven obscurator or optical beam switch 80, including a vane (not shown) which alternately obscures one and then the other of the two light beams at a predetermined rate or frequency for transmission to the cells 78.

Referring particularly to FIG. 4, the alternate signal output from the photocell is amplified, demodulated and applied to a conventional self-regulator 15 which controls the parameters, e.g. temperature or concentration, of the real bath 14 to cause the difference between the alternating signals to approach zero, thereby causing the dyeing process to follow the linear concentration curve 2 shown in FIG. 1. However, it should be understood that self-regulators may be employed to control other physical-chemical parameters of the real bath 14 if desired.

It should be apparent to those skilled in the art that various modifications may be made to the method and apparatus disclosed without departing from the spirit and scope thereof, as described in the specification and defined in the appended claims.

I claim:

1. A method of controlling the rate of deposition of dye in a dyebath as a function of time, comprising the steps of:
   preparing a pure bath, having no coloring agent,
   drawing off a sample of said pure bath,
   producing the real bath by adding a coloring agent to a remaining volume of the pure bath,
   drawing an initial sample of real bath,
   adding pure bath to the initial sample of real bath at a predetermined rate, thereby producing a mixed sample having a concentration varying in a predetermined pattern with time,
   simultaneously with addition of the pure bath to the initial sample of real bath, introducing the article to be dyed into the real bath,
   continuously measuring and comparing at least one characteristic of the real bath with the same characteristic of the mixed sample, producing an output signal indicative of the result of the comparison and
   controlling at least one physical-chemical parameter of the real bath in response to the electric signal to control the rate of deposition of dye in the dyebath.

2. The method of claim 1 in which the comparison is a comparison of the light transmittance of the real bath with the mixed sample.

3. The method of claim 2 in which two electrical signals are generated alternately at the output of photo sensor means which are representative of the light transmittance from a light source through the real bath and the mixed sample respectively, and the comparison of the real bath and the mixed sample is accomplished by comparison of the two signals.

4. The method of claim 3 in which the difference between the two signals is used to control the parameters of the real bath.

5. The method of claim 3 in which the parameter to be controlled is temperature and the difference between the two signals is applied to a self-regulator to control the temperature of the real bath.

6. The method of claim 1 in which the pure bath is added to the initial sample of real bath at a constant rate and a portion of the resulting mixed sample is removed at a constant rate, providing a linear variation in the concentration of the resulting mixed sample with time.

7. The method of claim 1 in which the parameter to be controlled is temperature and this parameter is controlled by comparing the light transmittance of the real bath with that of the mixed bath.

8. The method of claim 1 in which a characteristic of the real bath and mixed sample is compared using an optical colorimeter.

9. A method of controlling the concentration of dyebath as a function of time, comprising the steps of:
   preparing a pure bath, having no coloring agent,
   preparing a real bath having a coloring agent,
   removing an initial sample of the real bath,
   adding pure bath to the initial sample of real bath at a predetermined rate, thereby producing a mixed sample having a concentration varying in a predetermined pattern with time,
   controlling the concentration of the real bath by adjustment of at least one of its physical-chemical parameters to follow the predetermined concentration pattern of the mixed sample.

10. An apparatus for controlling the concentration of a dyebath, comprising:
    a container for the real dyebath,
    a simulator, including a first container having a pure sample with no coloring agent, a second container having a mixed sample comprising pure sample mixed with the coloring agent, means connecting the first container to the second container for causing and controlling the flow thereto for producing a mixed sample having a concentration varying in a predetermined pattern with time,
    an optical comparator, including a first analysis vessel for the mixed sample, a second analysis vessel for a real dyebath sample, means for controlling the flow from the mixed sample container to the mixed sample analysis vessel, means for causing the real dyebath sample to flow to the second analysis vessel, means for optically comparing the two samples in the analysis vessels and producing an output signal indicative of the result of the comparison,
    a self-regulator connected to the optical comparator for adjusting at least one physical-chemical parameter of the real dyebath in accordance with the output signal from the comparator for controlling the concentration of the real bath.

11. The apparatus as claimed in claim 10 wherein:
    the optical comparison means includes a light source, an optical filter, optical means for guiding the light beams from the optical filter to the analysis vessels, and beam receiving means for converting the light transmitted through the analysis vessels and received by the beam receiving means into output signal.

12. The apparatus as claimed in claim 11 wherein:
    the optical guiding means includes two optical fibers, each positioned to guide its light beam to one of the analysis vessels,
    the optical comparator includes an optical beam switch for alternately obscurating one and then the other of the optical fibers at a predetermined frequency.

13. The method of claim 9 wherein the parameter which is adjusted is temperature.

14. The apparatus of claim 10 wherein the self-regulator is a temperature controller arranged to regulate the temperature of the real bath.

* * * * *

PO-1050
(5/69)

UNITED STATES PATENT OFFICE
CERTIFICATE OF CORRECTION

Patent No. 3,807,872          Dated April 30, 1974

Inventor(s) BERNARD VICTOR PRONIER

It is certified that error appears in the above-identified patent and that said Letters Patent are hereby corrected as shown below:

Page 1, at [73] Assignee, "Leonard" should be --Leanord--.

Column 6, Claim 11, line 52, before "output" insert --the--.

Signed and sealed this 26th day of November 1974.

(SEAL)
Attest:

McCOY M. GIBSON JR.          C. MARSHALL DANN
Attesting Officer            Commissioner of Patents